(12) United States Patent
Wang et al.

(10) Patent No.: US 11,520,997 B2
(45) Date of Patent: Dec. 6, 2022

(54) COMPUTING DEVICE AND METHOD FOR GENERATING MACHINE TRANSLATION MODEL AND MACHINE-TRANSLATION DEVICE

(71) Applicant: National Central University, Taoyuan (TW)

(72) Inventors: Jia-Ching Wang, Taoyuan (TW); Yi-Xing Lin, Taoyuan (TW)

(73) Assignee: National Central University, Taoyuan (TW)

( * ) Notice: Subject to any disclaimer, the term of this patent is extended or adjusted under 35 U.S.C. 154(b) by 276 days.

(21) Appl. No.: 16/699,477

(22) Filed: Nov. 29, 2019

(65) Prior Publication Data
US 2021/0157991 A1 May 27, 2021

(30) Foreign Application Priority Data
Nov. 25, 2019 (TW) ................................ 108142757

(51) Int. Cl.
*G06F 40/58* (2020.01)
*G06F 40/242* (2020.01)
*G06N 20/00* (2019.01)

(52) U.S. Cl.
CPC ............ *G06F 40/58* (2020.01); *G06F 40/242* (2020.01); *G06N 20/00* (2019.01)

(58) Field of Classification Search
None
See application file for complete search history.

(56) References Cited

U.S. PATENT DOCUMENTS

2020/0257985 A1\* 8/2020 West .................... G06N 3/0445

FOREIGN PATENT DOCUMENTS

CN 201811285344 A \* 11/2018 ............. G06F 17/50

OTHER PUBLICATIONS

Guillaume Lample et al. "Phrase-Based & Neural Unsupervised Machine Translation", arXiv:1804.07755v2 [cs.CL] Aug. 13, 2018, 14 pages.
Guillaume Lample et al. "Unsupervised machine translation using monolingual corpora only", arXiv:1711.00043v2 [cs.CL] Apr. 13, 2018, 14 pages.

(Continued)

*Primary Examiner* — Quynh H Nguyen
(74) *Attorney, Agent, or Firm* — Skaar Ulbrich Macari, P.A.

(57) ABSTRACT

A device and a method for generating a machine translation model and a machine translation device are disclosed. The device inputs a source training sentence of a source language and a dictionary data to a generator network so that the generator network outputs a target training sentence of a target language according to the source training sentence and the dictionary data. Then, the device inputs the target training sentence and a correct translation of the source training sentence to a discriminator network so as to calculate an error between the target training sentence and the correct translation according to the output of the discriminator network, and trains the generator network and the discriminator network respectively. The trained generator network is the machine translation model.

16 Claims, 5 Drawing Sheets

(56) References Cited

OTHER PUBLICATIONS

Office Action to the corresponding Taiwan Patent Application rendered by the Taiwan Intellectual Property Office (TIPO) dated Jan. 27, 2021, 21 pages (including English translation).

Phillip Keung et al., Adversarial Learning with Contextual Embeddings for Zero-resource Cross-lingual Classification and NER, Proceedings of the 2019 Conference on Empirical Methods in Natural Language Processing and the 9th International Joint Conference on Natural Language Processing (EMNLP-I JCNLP), Nov. 3, 2019-Nov. 7, 2019, https://www.aclweb.org/anthology/D19-1138.pdf, 6 pages.

Mikel Artetxe et al., Massively multilingual sentence embeddings for Zero-Shot cross-lingual transfer and beyond. Sep. 25, 2019, https://arxiv.org/pdf/1812.10464.pdf, 14 pages.

* cited by examiner

COMPUTING DEVICE AND METHOD FOR GENERATING MACHINE TRANSLATION MODEL AND MACHINE-TRANSLATION DEVICE

PRIORITY

This application claims priority to Taiwan Patent Application No. 108142757 filed on Nov. 25, 2019, which is hereby incorporated by reference in its entirety.

FIELD

The present disclosure relates to a computing device, a method and a machine-translation device for generating a machine-translation model. More particularly, the present disclosure relates to a computing device, a method and a machine-translation device for generating a machine-translation model via training a generative adversarial network (GAN).

BACKGROUND

Conventional ways of generating a machine-translation model using deep learning are to project the words of a source language (i.e., the language to be translated from) and a target language (i.e., the language to be translated to) to a vector space respectively, and then input the projected words to a deep-learning neural network such that the neural network automatically learns the correspondence between the source language and the target language, thereby delivering the effect of translation. There will be a difference between the source language and the target language when they are projected into the vector space (i.e., a distance in the vector space), since they are two different languages.

When the difference between the source language and the target language is quite large (e.g., the two languages belonging to different language systems), however, it may possibly be difficult to shorten the distance between the two languages in the vector space, therefore making it difficult for the neural network to learn the correspondence between the languages efficiently, deteriorating the translation quality of the machine-translation model, or even making it barely possible for the languages to be projected to the same vector space. In view of this, it is important to provide a way of a generating machine-translation model, which is capable of training the machine-translation model rapidly in spite of the large difference between the source language and the target language.

SUMMARY

To solve at least the aforesaid problems, the present disclosure provides a computing device for generating a machine-translation model. The computing device may comprise a storage and a processor electrically connected with the storage. The storage may be configured to store a dictionary data and a generative adversarial network (GAN). The dictionary data may comprise a correspondence between a plurality of words of a source language and a plurality of words of a target language. The GAN may comprise a generator network and a discriminator network. The processor may be configured to input a source training sentence of the source language and the dictionary data to the generator network, such that the generator network output a target training sentence of the target language according to the source training language and the dictionary data. The processor may further be configured to input the target training sentence and a correct translation of the source training sentence to the discriminator network to calculate an error between the target training sentence and the correct translation according to an output of the discriminator network. Then, the processor may further be configured to train the generator network and the discriminator network respectively according to the error. The trained generator network is the machine-translation model.

To solve at least the aforesaid problems, the present disclosure further provides a method for a computing device to generate a machine-translation model. The computing device may store a dictionary data and a generative adversarial network (GAN). The dictionary data may comprise a correspondence between a plurality of words of a source language and a plurality of words of a target language, and the GAN comprises a generator network and a discriminator network. The method may comprise:

inputting, by the computing device, a source training sentence of the source language and the dictionary data to the generator network, such that the generator network output a target training sentence of the target language according to the source training language and the dictionary data;

inputting, by the computing device, the target training sentence and a correct translation of the source training sentence to the discriminator network to calculate an error between the target training sentence and the correct translation according to an output of the discriminator network; and training, by the computing device, the generator network and the discriminator network respectively according to the error, wherein the trained generator network is the machine-translation model.

To solve at least the aforesaid problems, the present disclosure further provides a machine-translation device. The machine-translation device may comprise a storage and a processor electrically connected with the storage. The storage may be configured to store a dictionary data. The dictionary data may comprise a correspondence between a plurality of words of a source language and a plurality of words of a target language. The processor may be configured to generate a word sequence of the target language according to a source sentence of the source language and the dictionary data. Then, the processor may be further configured to generate a plurality of word-embedding vectors of the target language based on the word sequence. Moreover, the processor may be further configured to input the word-embedding vectors of the target language to a Transformer model, so as to obtain a target sentence of the target language.

As described above, by introducing the dictionary data to the training stage and the inference stage of the generator network, the distance between the source language and the target language may be diminished, and therefore the complexity translation may be reduced. The sentences output by the generator network may also become more accurate, and accordingly the training error of the generator network may be converged in a quicker manner, therefore reducing the training time of the GAN. As a result, at least the aforesaid problems of the conventional ways of generating a machine-translation model using deep-learning models can be effectively solved by introducing the dictionary data to training the GAN for generating machine-translation models.

BRIEF DESCRIPTION OF THE DRAWINGS

The drawings are provided for describing various embodiments, in which.

DETAILED DESCRIPTION

The exemplary embodiments described below are not intended to limit the present invention to any specific environment, applications, structures, processes or steps as described in these embodiments. In the attached figures, elements not directly related to the present invention are omitted from depiction. In the attached figures, dimensional relationships among individual elements in the attached drawings are merely examples but not to limit the actual scale. Unless otherwise described, the same (or similar) element symbols may correspond to the same (or similar) elements in the following description. Unless otherwise described, the number of each element described below may be one or more under implementable circumstances.

Figure 1:
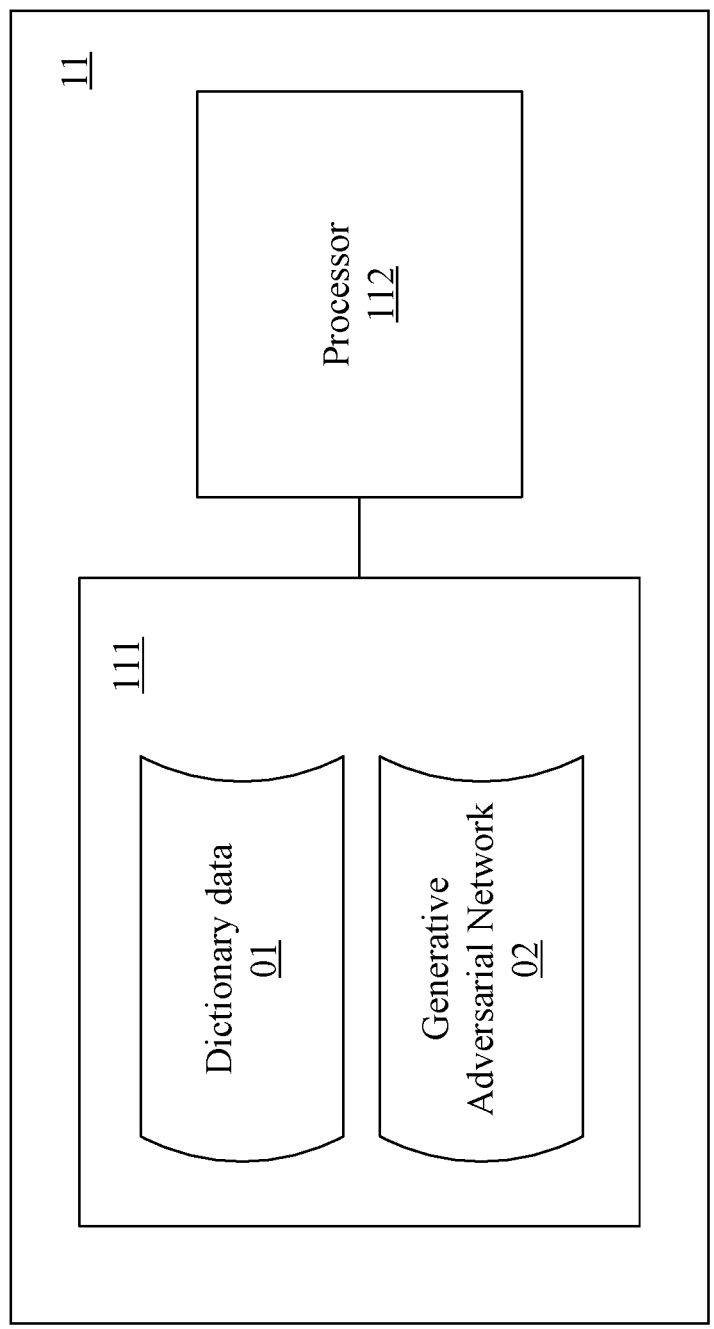
FIG. 1 illustrates a device for generating a machine-translation model according to one or more embodiments of the present invention.

FIG. 1 illustrates a device for generating a machine-translation model according to one or more embodiments of the present invention. The contents shown in FIG. 1 are merely for explaining the embodiments of the present invention instead of limiting the present invention.

Referring to FIG. 1, a computing device 11 for generating a machine-translation model may basically comprise a storage 111 and a processor 112 electrically connected with the storage 111. The storage 111 may be configured to store a piece of dictionary data 01 and generative adversarial network (GAN) 02. The processor 112 may be configured to train the GAN 02.

The storage 111 may be configured to store the data produced by the computing device 11 or received from the outside of the computing device 11. For example, the data may include the dictionary data 01. The storage 111 may comprise a first-level memory (also referred to as main memory or internal memory), and the processor 112 may directly read the instruction set stored in the first-level memory and execute the instruction sets as needed. The storage 111 may optionally comprise a second-level memory (also referred to as an external memory or a secondary memory), and the second-level memory may transmit the stored data to the first-level memory through the data buffer. For example, the second-level memory may be, but not limited to, a hard disk, a compact disk, or the like. The storage 111 may optionally comprise a third-level memory, that is, a storage device that may be directly inserted or removed from a computer, such as a portable hard disk. In some embodiments, the storage 111 may optionally comprise a cloud storage unit.

The processor 112 may be a microprocessor or a microcontroller having a signal processing function. A microprocessor or microcontroller is a programmable special integrated circuit that has the functions of operation, storage, output/input, etc., and can accept and process various coding instructions, thereby performing various logic operations and arithmetic operations, and outputting the corresponding operation result. The processor 112 may be programmed to execute various operations or programs in the computing device 11.

The dictionary data 01 may record a correspondence of a plurality of words of a source language and a plurality of words of a target language. For example, assume that the source language is Chinese and the target language is English, then the dictionary data 01 may record a word correspondence collected from a Chinese-English dictionary and/or an English-Chinese dictionary, i.e., the dictionary data 01 may record the correspondence between a plurality of Chinese words (e.g., "我", "愛", "字典") and a plurality of English words (e.g., "I", "love", "dictionary"). In some embodiments, aside from the direct word correspondence between the languages, the dictionary data 01 may further comprise the indirect correspondence between the languages, for example but not limited to, synonyms, antonyms, approximate words, etc.

In some embodiments, the dictionary data 01 may be input by a user to the computing device 11, or received from an outside database by the computing device 11. In some embodiments, the computing device 11 may further comprise an network interface (not shown), and the network interface may be configured to receive the dictionary data 01 from a cloud database via a network.

Figure 2A:
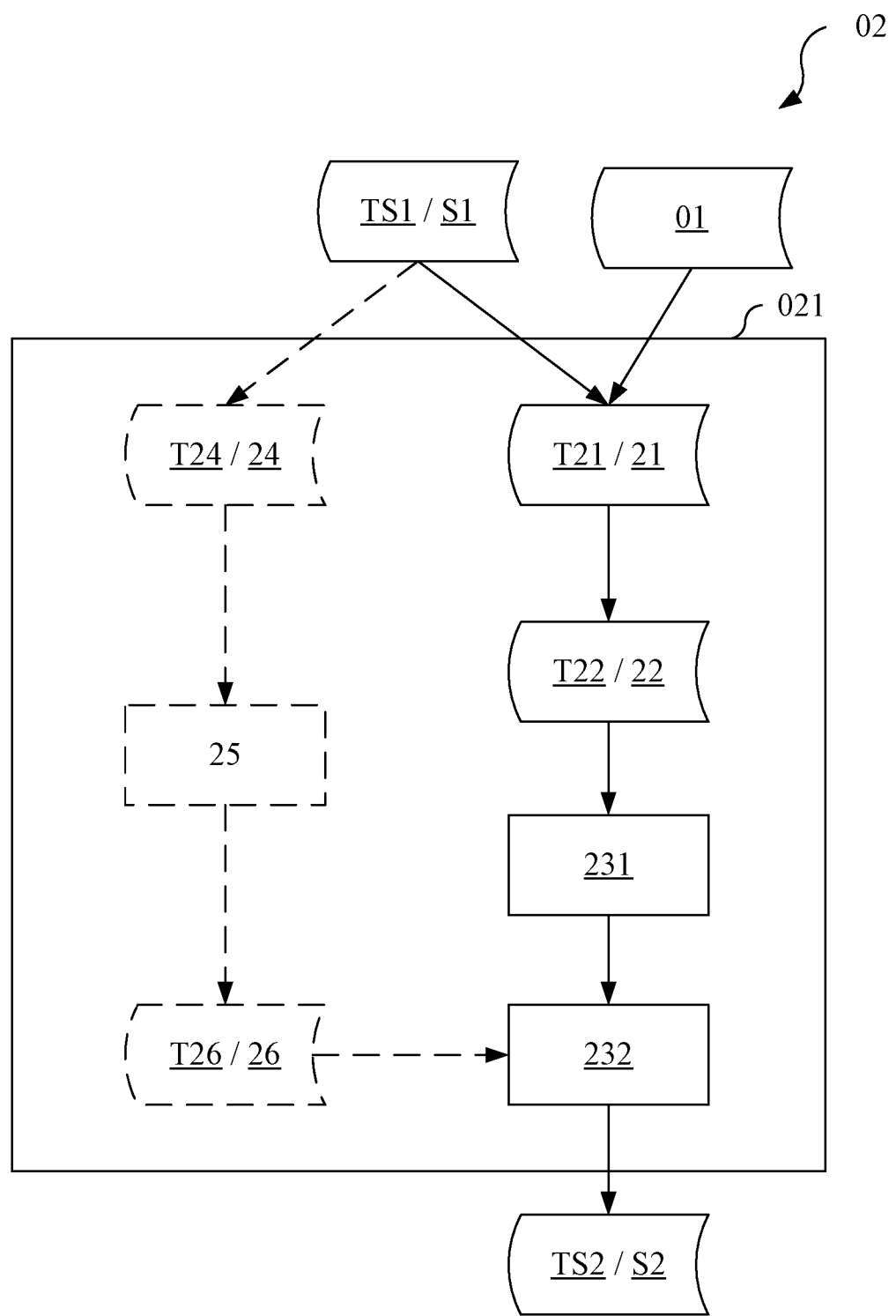
FIGS. 2A-2B illustrate a generative adversarial network according to one or more embodiments of the present invention.
Figure 2B:
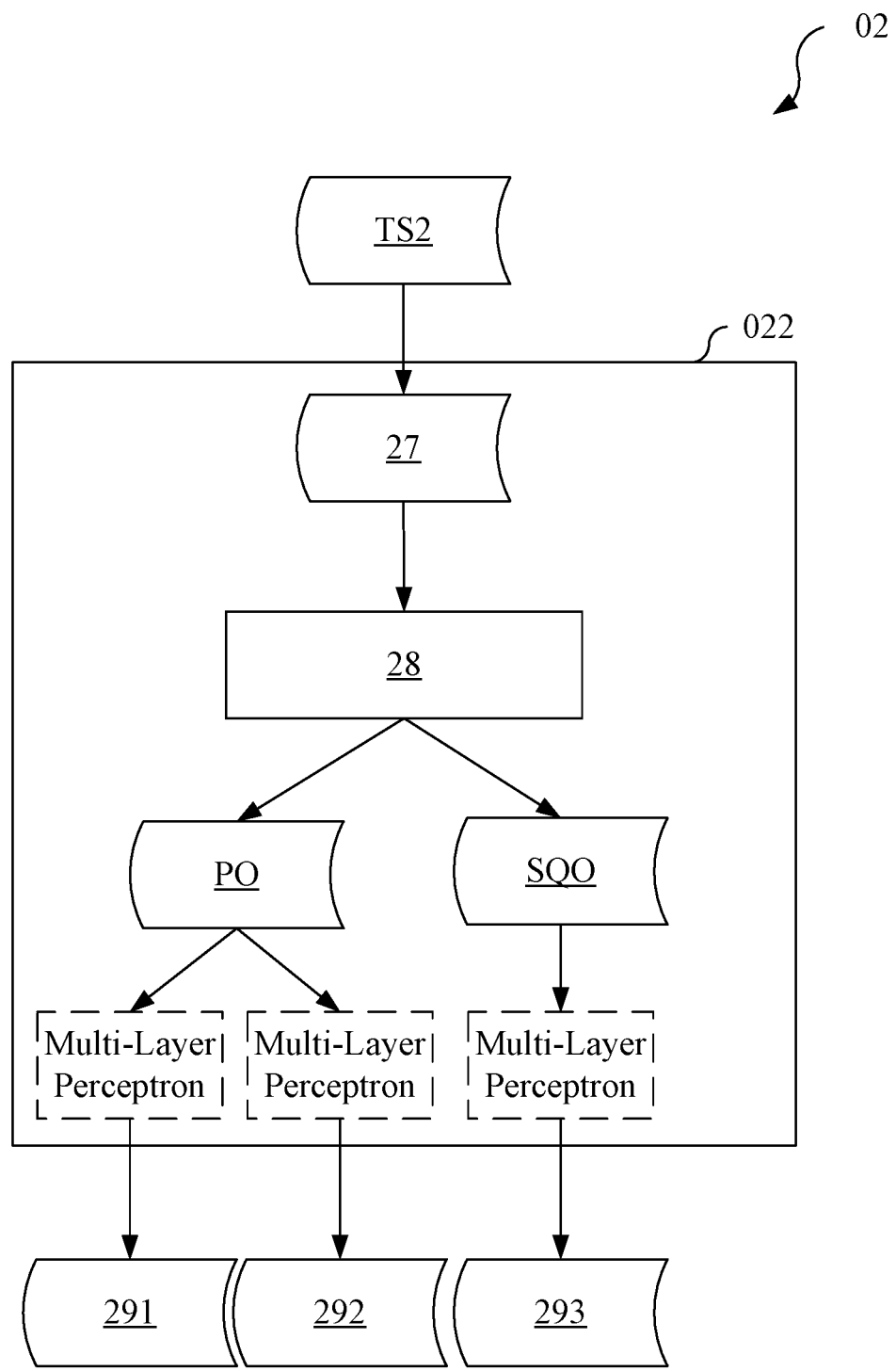

FIGS. 2A-2B illustrate a generative adversarial network according to one or more embodiments of the present invention. The contents shown in FIGS. 2A-2B are merely for explaining the embodiments of the present invention instead of limiting the present invention.

Referring to FIG. 2A and FIG. 2B together, a GAN 02 may comprise a generator network 021 and a discriminator network 022. As shown in FIG. 2A, the generator network 021 may at least comprise a Transformer model 23 (not shown), and the Transformer model 23 may comprise an encoder 231 and a decoder 232. The Transformer model 23 is a self-attention-based sequence-to-sequence (Seq2Seq) model. The details related to the Transformer model can be understood by people having ordinary skill in the art, and thus will not be further described herein. The GAN 02 and the components comprised thereby, such as the generator network 021, the discriminator network 022, the Transformer model 023 or the like, may be executed by the processor 112 so as to perform one or more actions described in the context.

When training the GAN 02, the processor 112 may input a source training sentence TS1 of the source language and the dictionary data 01 to the generator network 021. The generator network 021 may respectively convert a plurality of words included in the source training sentence TS1 into a plurality of words of the target language according to the dictionary data 01, so as to generate a training word sequence T21 of the target language. In some embodiments, before converting the source training sentence TS1 into the training word sequence T21, the generator 021 may preprocess each of the words in the source training sentence TS1 to distinguish, for subsequent query of the dictionary data 01, possible vocabularies formed by the word.

Then, the generator network 021 may convert the training word sequence T21 into a plurality of training word-embedding vectors T22 of the target language, and respectively input the training word-embedding vectors T22 to the encoder 231 of the Transformer model 23. The encoder 231 may thus input its output to the decoder 232, such that the decoder 232 may generate a target training sentence TS2 accordingly.

In some embodiments, the generator network 021 may further comprise a bidirectional encoder representation from Transformers (hereinafter referred to as "BERT") model 25, and the generator network 021, besides converting the source training sentence TS1 into the training word sequence T21, may also convert the source training sentence TS1 into a plurality of word-embedding vectors T24 of the source language, and may input the word-embedding vectors T24 to the BERT model 25. The BERT model 25 may convert the word-embedding vectors T24 into a training sentence-embedding vector T26. Then, the generator network 021 may further input the training sentence-embedding vector T26 and the output of the encoders 231 to the decoder 232, so as to generate a target training sentence TS2. By additionally referring to the training sentence-embedding vector T26 generated by the BERT model 25, the generator network 021 may perform a more precise semantic recognition to the source training sentence TS1, and the target training sentence TS2 output by the generator network 021 may be closer to the ideal translation result.

After obtaining the target training sentence TS2, the processor 112 may input the source training sentence TS2 and a correct translation of the source training sentence TS1 to the discriminator network 022, so as to calculate an error between the target training sentence TS2 and the correct translation according to the output of the discriminator network 022.

Specifically, as shown in FIG. 2B, the discriminator network 022 may at least comprise a BERT model 28. The discriminator network 022 may first convert the target training sentence TS2 into a plurality of target training word-embedding vectors 27, and input the target training word-embedding vectors 27 and the correct translation to the BERT model 28 so as to obtain a predicted true/false value 291, a predicted statistical score 292, and a predicted sentence structure 293.

In the output of the discriminator network 022, the predicted true/false value 291 may be a true/false value of the discriminator network 022 judging whether the target training sentence TS2 is a real sentence or a sentence forged by the generator network 021, and it may be, for example, but not limited to, a Boolean value. For example, the predicted true/false value 291 being zero indicates that the discriminator network 022 judges that target training sentence TS2 is a real sentence, and the predicted true/false value 291 being one indicates that the discriminator network 022 judges that the target training sentence TS2 is a forged sentence. The predicted statistical score 292 may be an inference result of the discriminator network 022 evaluating the translation quality of the target training sentence TS2 in a statistical evaluation manner. The predicted sentence structure 293 may be an inference result of the discriminator network 022 determining the syntax structure (e.g., parts of speech, punctuation position, etc.) of the target training sentence TS2.

In some embodiments, regarding the output of the discriminator network 022, the pooling output PO of the BERT model 28 may be input to two multi-layer perceptrons (MLP) for projection, so as to generate the predicted true/false value 291 and the predicted statistical score 292, respectively, and the sequence output SO of the BERT model 28 may be input to another MLP for projection so as to generate the predicted sentence structure 293.

On the other hand, the processor 112 may calculate a correct statistical score according to the correct translation of the source training sentence TS1 and the target training sentence TS2 generated by the generator network 021, and analyzes the target training sentence TS2 to obtain a correct sentence structure of the target training sentence TS2 via a natural language toolkit (NLTK). The correct statistical score may be, for example, but not limited to, a bilingual evaluation understudy (BLEU) score or an F1 score.

After obtaining the output of the discriminator network 022, considering that the target training sentence TS2 is generated by the generator network 021, the processor 112 may know whether the judgement made by the discriminator network 022 toward the target training sentence TS2 is correct, so as to calculate an error of true/false value. In addition, the processor 112 may calculate an error of statistical score by comparing the predicted statistical score 292 with the correct statistical score. Similarly, the processor 112 may calculate an error of sentence structure by comparing the predicted sentence structure 293 with the correct sentence structure.

In some embodiments, the error of true/false value, the error of statistical score, and the error of sentence structure may be regarded as an error in generating the GAN 02, and the processor 112 may train the GAN 02 according to the error of the GAN 02, that is, training the generator network 021 and the discriminator network 022 respectively. Specifically, the processor 112 may update the generator network 021 or the discriminator network 022 based on the error and using a policy gradient. After the processor 112 finishes training the GAN 02, the trained generator network 021 is the machine translation model that the computing device 11 intends to generate.

In summary, in addition to the existing errors of true/false value of the ordinary GAN, the processor 112 additionally converges on the error of statistical score and the error of sentence structure when training the GAN 02, and therefore the output of the trained discriminator network 022 will be more accurate and with more basis, and the efficiency of the computing device 11 in generating the machine-translation model will be improved accordingly.

Figure 3:
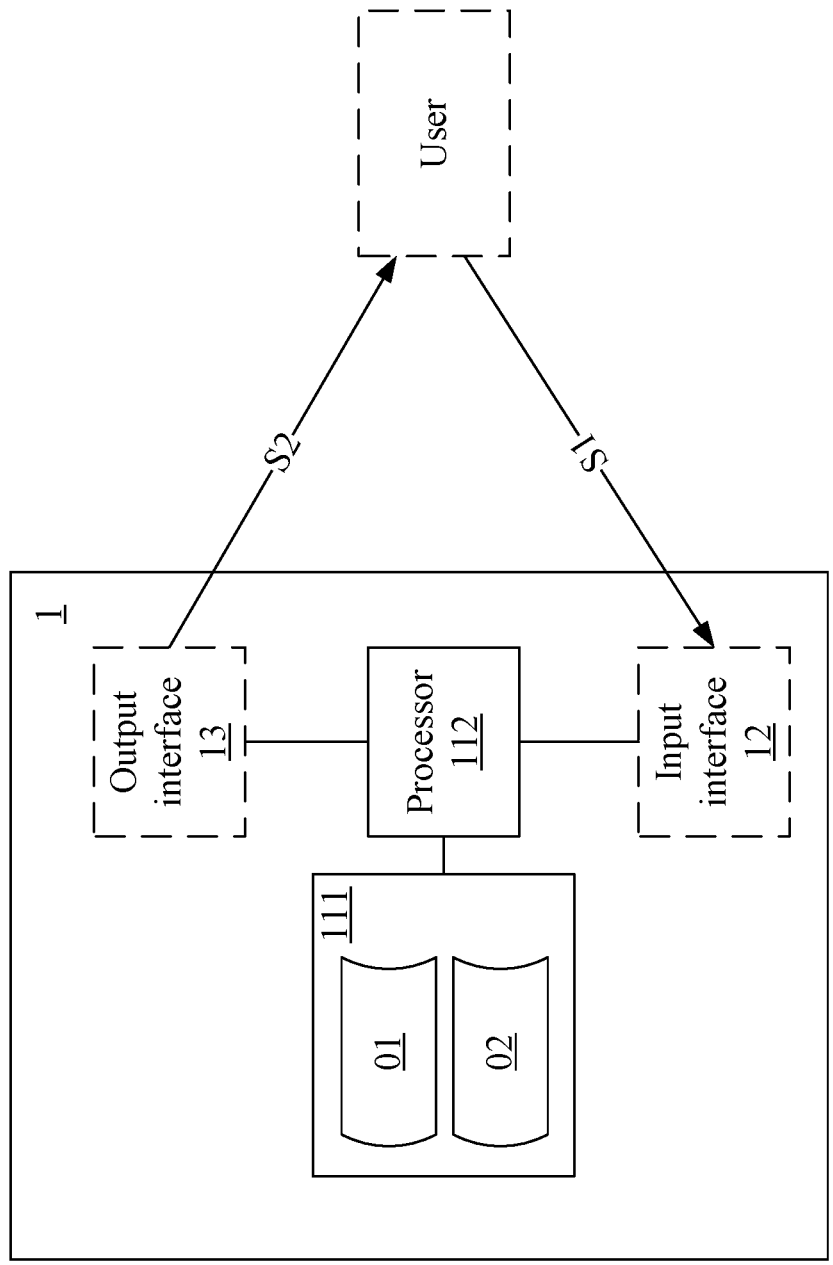
FIG. 3 illustrates a machine-translation device according to one or more embodiments of the present invention.

FIG. 3 illustrates a machine-translation device according to one or more embodiments of the present invention. The contents shown in FIG. 3 are merely for explaining the embodiments of the present invention instead of limiting the present invention.

Referring to FIG. 3, the machine-translation device 1 may comprise all the elements and embodiments of the computing device 11, that is, the machine-translation device 1 may train the GAN 02 in the same manner as described above and generate a machine-translation model (i.e., the trained generator network 021) accordingly. In view of this, the specific details of the machine-translation model generated by the machine-translation device 1 can be understood by a person having ordinary skills in the art according to the above content, and therefore will not be further described herein.

In some embodiments, the machine-translation device 1 may comprise an input interface 12 and an output interface 13. Both the input interface 12 and the output interface 13 may be electrically connected with the processor 112. The input interface 12 may be configured to receive data and/or instructions from an external source, and the output interface 13 may be configured to output and/or display data. For example, the input interface 12 may be a keyboard, a mouse, a touch panel, or a wired/wireless communication interface or the like, so as to allow a user to input a source sentence S1 (i.e., the sentence that user wants to translate) to the machine-translation device 1 through the input interface 12. The output interface 13 may be a display or the wired/wireless communication interface, whereby the translated target sentence S2 may be presented to the user through the output interface 13 or transmitted to the user through the output interface 13.

Referring to FIG. 2A and FIG. 3 at the same time, as described above, since the trained generator network 021 is the machine-translation model, the processor 112 may input the source sentence S1 and the dictionary data 01 to the generator network 021 during the translation process, and obtain the output target sentence S2 from the generator network 021. Similar to the source training sentence TS1 and the target training sentence TS2, the source sentence S1 and the target sentence S2 may correspond to a source language and a target language, respectively.

The generator network 021 may convert the plurality of words included in the source sentence S1 into a plurality of corresponding words of the target language one by one according to the dictionary data 01 to generate a word sequence 21 of the target language. In some embodiments, before converting the source sentence S1 into the word sequence 21, the generator network 021 may pre-process each word in the source sentence S1 to distinguish, for subsequent query of the dictionary data 01, possible vocabularies formed by each word.

Then, the generator network 021 may convert the word sequence 21 into a plurality of word-embedding vectors 22 of the target language, and input the word-embedding vectors 22 to the encoder 231 of the Transformer model 23 one by one. The encoder 231 then inputs its output to the decoder 232, so that the decoder 232 may generate the target sentence S2 accordingly.

In some embodiments, in addition to converting the source sentence S1 into a word sequence 21, the generator network 021 may also convert the source sentence S1 into a plurality of word-embedding vectors 24 of the source language, and input the word-embedding vectors 24 to a BERT model 25. The BERT model 25 may convert the word-embedding vectors 24 into a sentence-embedding vector 26. Then, the generator network 021 may also input the sentence-embedding vector 26 and the output of the encoder 231 to the decoder 232 to generate the target sentence S2. By additionally referring to the sentence embedding vector 26 generated by the BERT model 25, the generator network 021 can make a more accurate semantic recognition of the source sentence S1, so the target sentence S2 output thereby can be closer to the ideal translation result.

Figure 4:
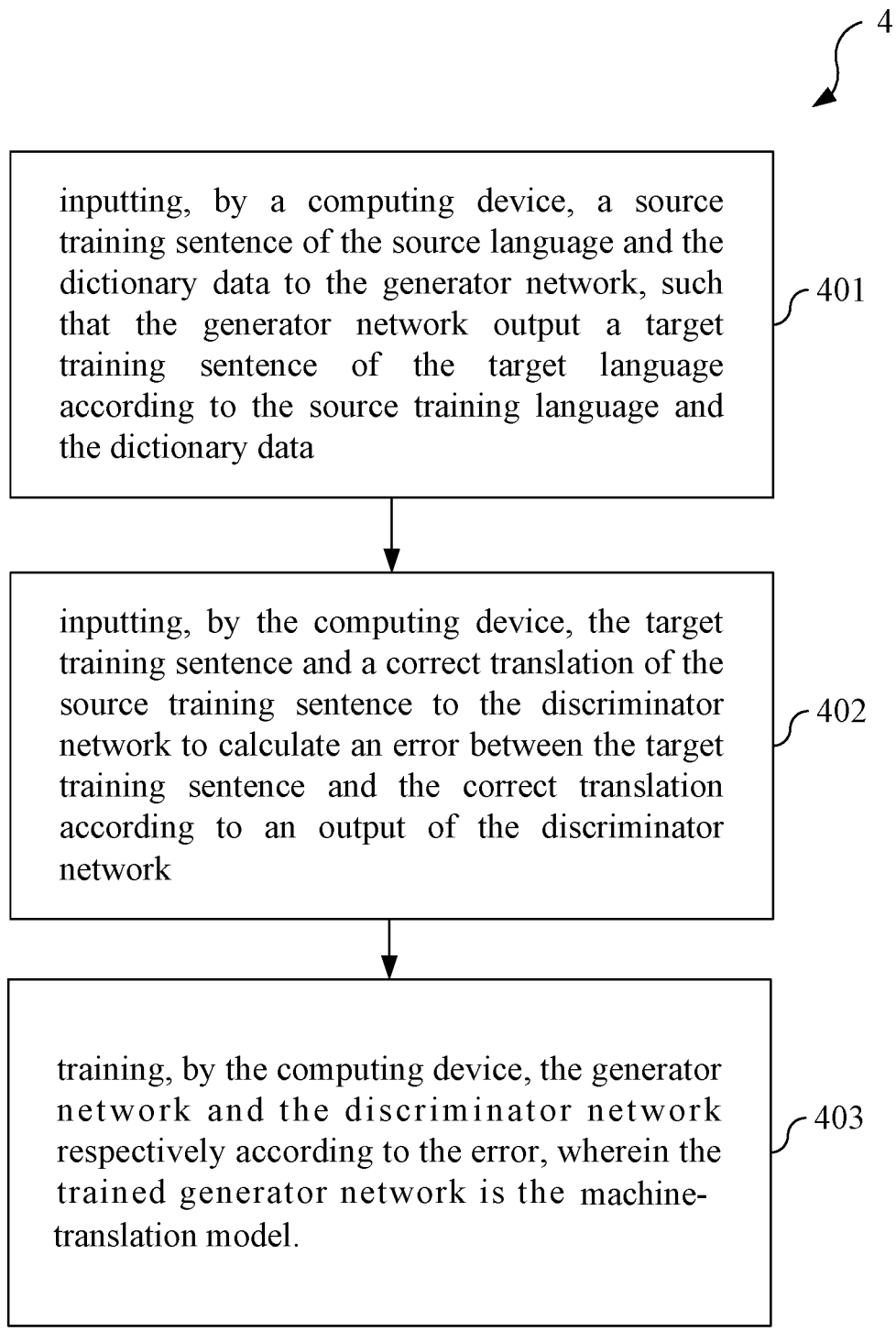
FIG. 4 illustrates a method for generating a machine-translation model according to one or more embodiments of the present invention.

FIG. 4 illustrates a method for generating a machine-translation model according to one or more embodiments of the present invention. The contents shown in FIG. 4 are merely for explaining the embodiments of the present invention instead of limiting the present invention.

Referring to FIG. 4, a method 4 for generating a machine-translation model may comprise the following steps:

inputting, by a computing device, a source training sentence of the source language and the dictionary data to the generator network, such that the generator network output a target training sentence of the target language according to the source training language and the dictionary data (marked as 401);

inputting, by the computing device, the target training sentence and a correct translation of the source training sentence to the discriminator network to calculate an error between the target training sentence and the correct translation according to an output of the discriminator network (marked as 402); and training, by the computing device, the generator network and the discriminator network respectively according to the error, wherein the trained generator network is the machine-translation model (marked as 403).

The order of steps shown in FIG. 4 is not limited, and the order of steps shown in FIG. 4 may be arbitrarily adjusted if it can be implemented.

In some embodiments, regarding the method 4 for generating the machine-translation model, the generator network may comprise a Transformer model, and the method 4 may further comprise the following steps:

generating, by the computing device, a training word sequence of the target language according to the source training sentence and the dictionary data;

generating, by the computing device, a plurality of training word-embedding vectors of the target language according to the training word sequence; and inputting, by the computing device, the training word-embedding vectors to the Transformer model to generate the target training sentence via the Transformer model.

In some embodiments, regarding the method 4 for generating the machine-translation model, the discriminator network may further comprise a bidirectional encoder representation from Transformer (BERT) model, and the method 4 may further comprise the following steps:

generating, by the computing device, a plurality of target training word-embedding vectors based on the target training sentence; and inputting, by the computing device, the target training word-embedding vectors to the BERT model, so as to generate a predicted true/false value, a predicted statistical score and a predicted sentence structure.

In some embodiments, regarding the method 4 for generating the machine-translation model, the generator network may further comprise another BERT model, and the method 4 may further comprise the following steps:

generating, by the computing device, a plurality of word-embedding vectors of the source language based on the source training sentence;

inputting, by the computing device, the word-embedding vectors of the source language to the other BERT model so as to obtain a training sentence-embedding vector; and inputting, by the computing device, the training sentence-embedding vector to the Transformer model so as to generate the target training sentence.

In some embodiments, regarding the method 4 for generating the machine-translation model, the discriminator network may further comprise a BERT model, and the generator network may comprise another BERT model, and the method 4 may further comprise the following steps:

generating, by the computing device, a plurality of word-embedding vectors of the source language based on the source training sentence;

inputting, by the computing device, the word-embedding vectors of the source language to the other BERT model so as to obtain a training sentence-embedding vector;

inputting, by the computing device, the training sentence-embedding vector to the Transformer model so as to generate the target training sentence;

generating, by the computing device, a plurality of training word-embedding vectors of the target language according to the target training sentence;

inputting, by the computing device, the target training word-embedding vectors to the BERT model, so as to generate a predicted true/false value, a predicted statistical score and a predicted sentence structure;

calculating, by the computing device, a correct statistical score according to the correct translation, wherein the correct statistical score is a bilingual evaluation understudy (BLEU) score or an F1 score;

analyzing, by the computing device, the correct translation via a natural language toolkit (NLTK) so as to obtain a correct sentence structure;

calculating, by the computing device, an error of true/false value based on the predicted true/false value and the source training sentence;

calculating, by the computing device, an error of statistical score according to the predicted statistical score and the correct statistical score; and calculating, by the computing device, an error of sentence structure according to the predicted sentence structure and the correct sentence structure; and the error between the target training sentence and the correct translation may at least comprise the error of true/false value, the error of statistical score, and the error of sentence structure.

In addition to the aforesaid embodiments, there are other embodiments of the method 4 for generating a machine-translation model which correspond to those of the computing device 11. These embodiments of the method 4 for generating a machine-translation model which are not mentioned specifically can be directly understood by people having ordinary skill in the art based on the aforesaid descriptions for the computing device 11, and will not be further described herein.

The above disclosure is related to the detailed technical contents and inventive features thereof. People of ordinary skill in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

The invention claimed is:

1. A computing device for generating a machine-translation model, comprising:
a storage, configured to store a dictionary data and a generative adversarial network (GAN), wherein the dictionary data comprises a correspondence between a plurality of words of a source language and a plurality of words of a target language, and the GAN comprises a generator network and a discriminator network; and
a processor, being electrically connected with the storage, and being configured to:
input a source training sentence of the source language and the dictionary data to the generator network, such that the generator network output a target training sentence of the target language according to the source training language and the dictionary data;
input the target training sentence and a correct translation of the source training sentence to the discriminator network to calculate an error between the target training sentence and the correct translation according to an output of the discriminator network; and
train the generator network and the discriminator network respectively according to the error, wherein the trained generator network is the machine-translation model.

2. The computing device of claim 1, wherein the generator network comprises a Transformer model, and in the generator network, the processor is further configured to:
generate a training word sequence of the target language according to the source training sentence and the dictionary data;
generate a plurality of training word-embedding vectors of the target language according to the training word sequence; and
input the training word-embedding vectors to the Transformer model to generate the target training sentence via the Transformer model.

3. The computing device of claim 1, wherein the discriminator network comprises a bidirectional encoder representation from Transformer (BERT) model, and in the discriminator network, the processor is further configured to:
generate a plurality of target training word-embedding vectors based on the target training sentence; and
input the target training word-embedding vectors to the BERT model, so as to generate a predicted true/false value, a predicted statistical score and a predicted sentence structure.

4. The computing device of claim 2, wherein the generator network further comprises another BERT model, and in the generator network, the processor is further configured to:
generate a plurality of word-embedding vectors of the source language based on the source training sentence;
input the word-embedding vectors of the source language to the other BERT model so as to obtain a training sentence-embedding vector; and
input the training sentence-embedding vector to the Transformer model so as to generate the target training sentence.

5. The computing device of claim 3, wherein the processor is further configured to:
calculate a correct statistical score according to the correct translation, wherein the correct statistical score is a bilingual evaluation understudy (BLEU) score or an F1 score;
analyze the correct translation via a natural language toolkit (NLTK) so as to obtain a correct sentence structure;
calculate an error of true/false value based on the predicted true/false value and the source training sentence;
calculate an error of statistical score according to the predicted statistical score and the correct statistical score; and
calculate an error of sentence structure according to the predicted sentence structure and the correct sentence structure; and
wherein the error between the target training sentence and the correct translation at least comprises the error of true/false value, the error of statistical score, and the error of sentence structure.

6. A method for a computing device to generate a machine-translation model, wherein the computing device stores a dictionary data and a generative adversarial network (GAN), the dictionary data comprises a correspondence between a plurality of words of a source language and a plurality of words of a target language, and the GAN comprises a generator network and a discriminator network, the method comprising:
inputting, by the computing device, a source training sentence of the source language and the dictionary data to the generator network, such that the generator network output a target training sentence of the target language according to the source training language and the dictionary data;
inputting, by the computing device, the target training sentence and a correct translation of the source training sentence to the discriminator network to calculate an error between the target training sentence and the correct translation according to an output of the discriminator network; and training, by the computing device, the generator network and the discriminator network respectively according to the error, wherein the trained generator network is the machine-translation model.

7. The method of claim 6, wherein the generator network comprises a Transformer model, and the method further comprises:

generating, by the computing device, a training word sequence of the target language according to the source training sentence and the dictionary data;

generating, by the computing device, a plurality of training word-embedding vectors of the target language according to the training word sequence; and inputting, by the computing device, the training word-embedding vectors to the Transformer model to generate the target training sentence via the Transformer model.

8. The method of claim 6, wherein the discriminator network comprises a bidirectional encoder representation from Transformer (BERT) model, and the method further comprises:

generating, by the computing device, a plurality of target training word-embedding vectors based on the target training sentence; and inputting, by the computing device, the target training word-embedding vectors to the BERT model, so as to generate a predicted true/false value, a predicted statistical score and a predicted sentence structure.

9. The method of claim 7, wherein the generator network further comprises another BERT model, and the method further comprises:

generating, by the computing device, a plurality of word-embedding vectors of the source language based on the source training sentence;

inputting, by the computing device, the word-embedding vectors of the source language to the other BERT model so as to obtain a training sentence-embedding vector; and inputting, by the computing device, the training sentence-embedding vector to the Transformer model so as to generate the target training sentence.

10. The method of claim 8, further comprising:

calculating, by the computing device, a correct statistical score according to the correct translation, wherein the correct statistical score is a bilingual evaluation understudy (BLEU) score or an F1 score;

analyzing, by the computing device, the correct translation via a natural language toolkit (NLTK) so as to obtain a correct sentence structure;

calculating, by the computing device, an error of true/false value based on the predicted true/false value and the source training sentence;

calculating, by the computing device, an error of statistical score according to the predicted statistical score and the correct statistical score; and calculating, by the computing device, an error of sentence structure according to the predicted sentence structure and the correct sentence structure; and wherein the error between the target training sentence and the correct translation at least comprises the error of true/false value, the error of statistical score, and the error of sentence structure.

11. A machine-translation device, comprising:

a storage, configured to store a dictionary data, wherein the dictionary data comprises a correspondence between a plurality of words of a source language and a plurality of words of a target language; and a processor, being electrically connected with the storage, and being configured to:

train a generative adversarial network (GAN) to generate a machine-translation model, generate a word sequence of the target language according to a source sentence of the source language and the dictionary data;

generate a plurality of word-embedding vectors of the target language based on the word sequence; and input the word-embedding vectors of the target language to a Transformer model in the machine-translation model, so as to obtain a target sentence of the target language;

wherein the GAN comprising:

a generator network comprising the Transformer model, wherein the processor is configured to generate a target training sentence of the target language according to a source training sentence of the source language and the dictionary data; and a discriminator network, wherein the processor is configured to determine a source of the target training sentence; and wherein the processor is further configured to:

input the target training sentence to the discriminator network to calculate an error between the target training sentence and a correct translation of the source training sentence according to an output of the discriminator network; and train the generator network and the discriminator network respectively according to the error, wherein the trained generator network is the machine-translation model.

12. The machine-translation device of claim 11, wherein the processor is further configured to:

generate a plurality of word-embedding vectors of the source language based on the word-embedding vectors;

input the word-embedding vectors of the source language to a bidirectional encoder representation from Transformer (BERT) model, so as to obtain a sentence-embedding vector; and input the sentence embedding vector to the Transformer model to generate the target sentence.

13. The machine-translation device of claim 11, wherein in the generator network, the processor is further configured to:

generate a training word sequence of the target language according to the source training sentence and the dictionary data;

generate a plurality of training word-embedding vectors of the target language according to the training word sequence; and input the training word-embedding vectors to the Transformer model to generate the target training sentence via the Transformer model.

14. The machine-translation device of claim 11, wherein the generator network further comprises another BERT model, and in the generator network, the processor is further configured to:

generate a plurality of word-embedding vectors of the source language based on the source training sentence;

input the word-embedding vectors of the source language to the other BERT model so as to obtain a training sentence-embedding vector; and input the training sentence-embedding vector to the Transformer model so as to generate the target training sentence.

15. The machine-translation device of claim 11, wherein the discriminator network comprises another BERT model, and in the discriminator network, the processor is further configured to:

generate a plurality of target training word-embedding vectors based on the target training sentence; and input the target training word-embedding vectors to the other BERT model, so as to generate a predicted true/false value, a predicted statistical score and a predicted sentence structure.

16. The machine-translation device of claim 14, wherein the processor is further configured to:

calculate a correct statistical score according to the correct translation, wherein the correct statistical score is a bilingual evaluation understudy (BLEU) score or an F1 score;

analyze the correct translation via a natural language toolkit (NLTK) so as to obtain a correct sentence structure;

calculate an error of true/false value based on the predicted true/false value and the source training sentence;

calculate an error of statistical score according to the predicted statistical score and the correct statistical score; and calculate an error of sentence structure according to the predicted sentence structure and the correct sentence structure; and wherein the error between the target training sentence and the correct translation at least comprises the error of true/false value, the error of statistical score, and the error of sentence structure.

* * * * *